(12) United States Patent
Hou

(10) Patent No.: US 6,245,992 B1
(45) Date of Patent: Jun. 12, 2001

(54) IC CHIP SECURITY BOX

(75) Inventor: Chien-Tzu Hou, Fremont, CA (US)

(73) Assignee: Geneticware Co., Ltd., Roas Town Tortola (VG)

( * ) Notice: Subject to any disclaimer, the term of this patent is extended or adjusted under 35 U.S.C. 154(b) by 0 days.

(21) Appl. No.: 09/334,136

(22) Filed: Jun. 15, 1999

(51) Int. Cl.[7] .................................................. H02G 3/08
(52) U.S. Cl. .................... 174/50; 174/52.1; 174/52.3; 361/1; 361/87
(58) Field of Search .................. 174/50, 52.1, 52.3; 361/1, 87

(56) References Cited

U.S. PATENT DOCUMENTS

| | | | | |
|---|---|---|---|---|
| 4,755,902 | * | 7/1988 | Takahashi | 361/1 |
| 5,360,941 | * | 11/1994 | Roes | 174/35 R |
| 5,491,612 | * | 2/1996 | Nicewarner, Jr. | 361/760 |
| 5,530,622 | * | 6/1996 | Takiar et al. | 174/50 X |
| 5,535,098 | * | 7/1996 | Jakob et al. | 174/50 X |
| 5,621,387 | * | 4/1997 | Phillips et al. | 174/51.2 X |
| 5,761,054 | * | 6/1998 | Kuhn | 174/52.1 X |
| 5,828,544 | * | 10/1998 | Matsuda | 174/50 X |
| 6,069,315 | * | 5/2000 | Tang | 174/50 |

* cited by examiner

Primary Examiner—Dean A. Reichard
Assistant Examiner—Angel R. Estrada

(57) ABSTRACT

An integrated circuit (IC) chip security box includes a top cover member and a bottom cover member respectively mounted to top and bottom sides of a circuit board to enclose an IC chip mounted to the circuit board. The cover members are made of conductive material for blocking radio frequency emission from the IC chip. Bolts secure the cover members to the circuit board. Conductive members are formed on one of the cover members and the circuit board and engage with each other when the security box is mounted to the circuit board thereby forming an electrical loop. Unauthorized opening of the security box breaks the electrical loop thereby causing a signal to the IC chip to initiate a purging process which deletes program codes written in the chip and prevents unauthorized copy of the codes.

3 Claims, 2 Drawing Sheets

IC CHIP SECURITY BOX

FIELD OF THE INVENTION

The present invention generally relates to an integrated circuit (IC) chip protection, and in particular to a security box for an IC chip.

BACKGROUND OF THE INVENTION

In the field of circuit design, it is common to write program in an integrated circuit (IC) chip to provide circuit functions in firmware form. The program that is written in the IC chip is generally not intended to be disclosed. However, a conventional IC package cannot protect the program codes written therein from unauthorized duplication. For example, program codes of a circuit may be accessed by detecting radio frequency emission from pins of the IC chip during the operation thereof or the codes may be directly accessed by electrically contacting the pins of the IC chip.

Thus, it is desired to have a security box for an IC chip which prevents program codes written therein from unauthorized copy.

SUMMARY OF THE INVENTION

Accordingly, an object of the present invention is to provide an IC chip security box which prevents unauthorized copy of program codes written in the chip.

Another object of the present invention is to provide an IC chip security box which prevent radio frequency signals from emitting outward from the IC chip.

To achieve the above object, in accordance with the present invention, there is provided an IC chip security box comprising a top cover member and a bottom cover member respectively mounted to top and bottom sides of a circuit board to enclose an IC chip mounted to the circuit board. The cover members are made of conductive material for blocking radio frequency emission from the IC chip. Bolts secure the cover members to the circuit board. Conductive members are formed on one of the cover members and the circuit board and engage with each other when the security box is mounted to the circuit board thereby forming an electrical loop. Unauthorized opening of the security box breaks the electrical loop thereby causing a signal to the IC chip to initiate a purging process which deletes program codes written in the chip and prevents unauthorized copy of the codes.

BRIEF DESCRIPTION OF THE DRAWINGS

The present invention will be apparent to those skilled in the art by reading the following description of a preferred embodiment thereof, with reference to the accompanying drawings, in which.

DETAILED DESCRIPTION OF THE PREFERRED EMBODIMENT

Figure 1:
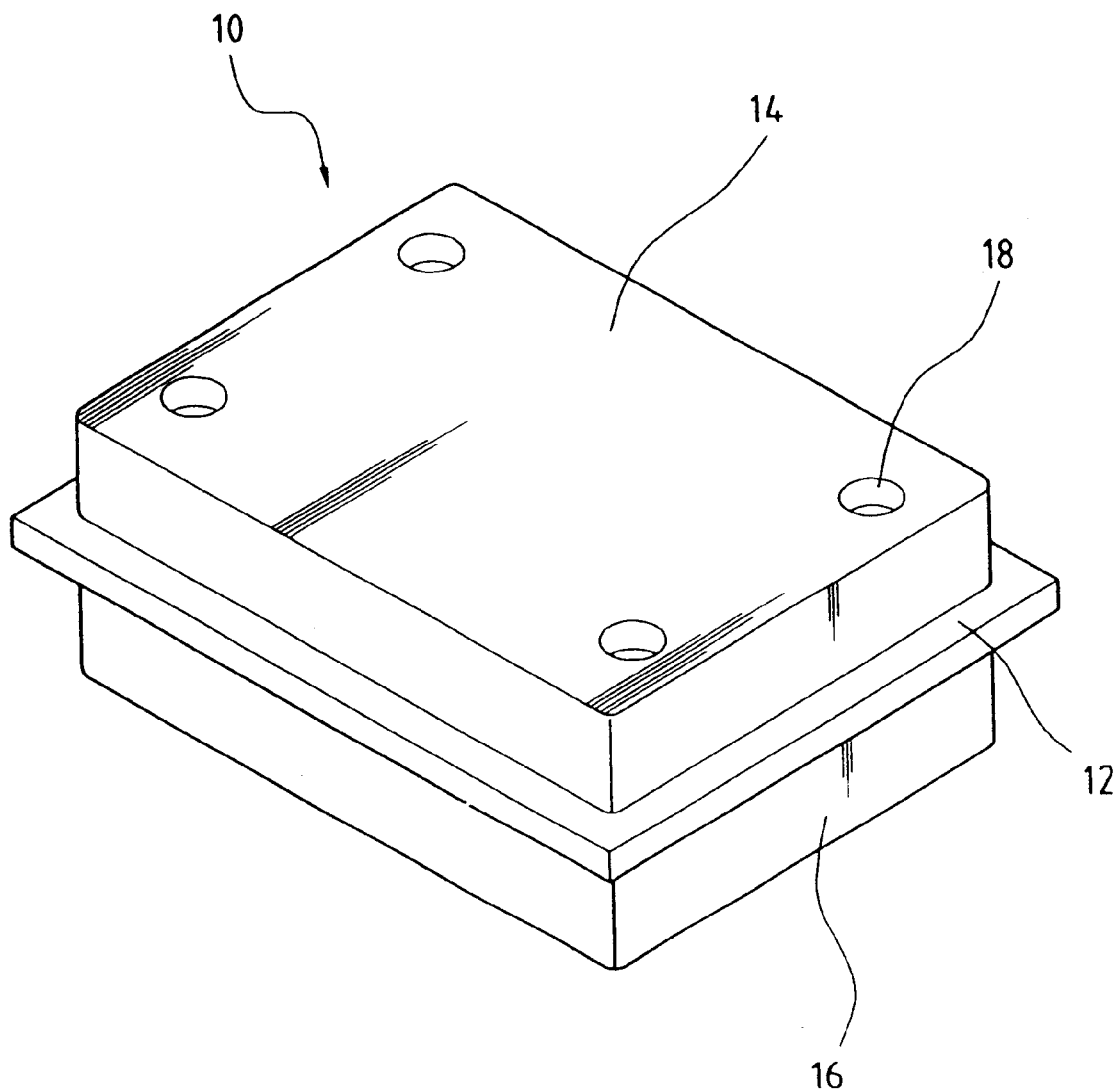
FIG. 1 is a perspective view of an IC chip security box constructed in accordance with the present invention.

With reference to the drawings and in particular to FIG. 1, wherein an IC chip security box constructed in accordance with the present invention, generally designated by reference numeral 10, is shown mounted on a circuit board 12 to enclose and protect an IC chip (not shown) mounted on the circuit board 12, the IC chip security box 10 comprises a top cover member 14 and a bottom cover member 16 respectively attached to top and bottom faces (not labeled) of the circuit board 12. The top and bottom cover members 14, 16 are secured to the circuit board 12 by means of fasteners 18, such as bolts.

Preferably the cover members 14, 16 comprise metal sheets for blocking radio frequency emission from the IC chip thereby preventing unauthorized copy of program code of the IC chip by means of the radio frequency emission of the chip.

Figure 2:
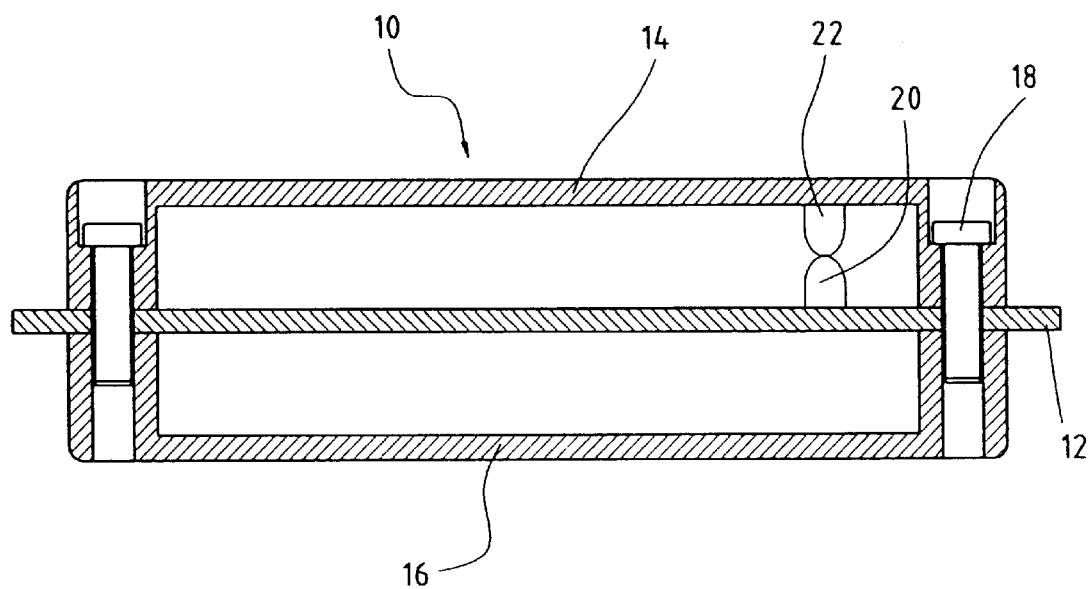
FIG. 2 is a cross-sectional view of the IC chip security box of the present invention.

Referring to FIG. 2, a first conductive member 20 is formed on the circuit board 12 and a second conductive member 22 is formed on an inside face of the top cover member 14. The conductive members 20, 22 engage with each other when the security box 10 is mounted to the circuit board 12 whereby an electrical loop is formed. The electrical loop is monitored by the program written in the IC chip whereby when unauthorized opening of the box 10 occurs, the electrical loop is broken and a signal is generated. The signal is immediately applied to the IC chip and the program initiates a purging process which deletes the program codes written in the IC chip thereby protecting the program codes from unauthorized copy.

The electrical loop may also be formed between the circuit board 12 and the bottom cover member 16. Alternatively, if desired, electrical loops may be formed between the circuit board 12 and both the top and bottom cover members 14, 16.

Although the present invention has been described with respect to the preferred embodiment, it is contemplated that a variety of modifications, variations and substitutions may be done without departing from the scope of the present invention that is intended to be defined by the appended claims. For example, any other known means may be used to replace the first and second conductive members to form the electrical loop or any known means that generates a signal when the security box is opened may be used to initiate the program purging process.

What is claimed is:

1. A security box for protecting an integrated circuit chip mounted on a circuit board, said security box comprising a top metal cover member and a bottom metal cover member respectively attached to top and bottom faces of the circuit board for enclosing the integrated circuit chip and blocking radio frequency emission from the integrated circuit chip, and means for forming an electrical loop between the circuit board and at least one of the cover members when the box is mounted to the circuit board whereby when the box is opened, the electrical loop is broken and a protection process is initiated to prevent unauthorized copy of program codes written in the integrated circuit chip, wherein the means for forming an electrical loop comprises a first conductive member protruded from the circuit board and a second conductive member protruded from said at least one of the cover members, and the two conductive members engaging with each other when said at least one of the cover members is mounted to the circuit board thereby forming the electrical loop.

2. The security box as claimed in claim 1, wherein the protection process comprises a process deleting the program codes.

3. The security box as claimed in claim 1, wherein the top and bottom cover members are fixed to the circuit board by means of bolts.

* * * * *